US012763709B2

(12) United States Patent
Sahu et al.

(10) Patent No.: US 12,763,709 B2
(45) Date of Patent: Oct. 13, 2026

(54) SENSORLESS OBSERVER BASED ZERO-SPEED START FOR FUEL CELL COMPRESSOR

(71) Applicant: Garrett Transportation I Inc., Torrance, CA (US)

(72) Inventors: Abhijit Sahu, Torrance, CA (US); Najib Rouhana, Thaon-les-Voges (FR); Ali Najmabadi, Redondo Beach, CA (US)

(73) Assignee: GARRETT TRANSPORTATION I INC., Torrance, CA (US)

( * ) Notice: Subject to any disclaimer, the term of this patent is extended or adjusted under 35 U.S.C. 154(b) by 467 days.

(21) Appl. No.: 18/366,811

(22) Filed: Aug. 8, 2023

(65) Prior Publication Data

US 2025/0055393 A1 Feb. 13, 2025

(51) Int. Cl.

| | |
|---|---|
| ***H01M 8/04111*** | (2016.01) |
| ***B60L 50/00*** | (2019.01) |
| ***B60L 50/51*** | (2019.01) |
| ***H02P 6/18*** | (2016.01) |
| *B60L 50/70* | (2019.01) |
| *H01M 8/10* | (2016.01) |

(52) U.S. Cl.

CPC ......... *H02P 6/181* (2013.01); *H01M 8/04111* (2013.01); *B60L 50/51* (2019.02); *B60L 50/70* (2019.02); *B60L 2210/40* (2013.01); *H01M 2008/1095* (2013.01); *H01M 2250/20* (2013.01); *H02P 2203/03* (2013.01); *H02P 2203/05* (2013.01); *H02P 2207/05* (2013.01)

(58) Field of Classification Search

CPC .. H02P 6/181; H02P 2203/03; H02P 2203/05; H02P 2207/05; H01M 8/04111; H01M 2008/1095; H01M 2250/20; B60L 2210/40; B60L 50/51; B60L 50/70

See application file for complete search history.

(56) References Cited

U.S. PATENT DOCUMENTS

| | | | | |
|---|---|---|---|---|
| 6,869,272 | B2 | 3/2005 | Odachi et al. | |
| 7,312,594 | B2 | 12/2007 | Yasui et al. | |
| 7,652,441 | B2 | 1/2010 | Ying | |
| 9,444,377 | B2 * | 9/2016 | Sato | H02P 6/18 |
| 9,556,874 | B2 | 1/2017 | Kidd et al. | |
| 10,411,621 | B2 * | 9/2019 | Hara | B62D 5/0463 |
| 10,778,123 | B2 | 9/2020 | Frampton et al. | |
| 10,958,201 | B2 * | 3/2021 | Lan | H02P 6/08 |

(Continued)

OTHER PUBLICATIONS

Hinkkanen et al.; "Observers for sensorless synchronous motor drives: framework for design and analysis "; IEEE Transactions on Industry Applications; Jul. 2018; vol. 54; No. 6; pp. 6090-6100; https://doi.org/10.1109/TIA.2018.2858753.

(Continued)

*Primary Examiner* — Thai T Dinh

(74) *Attorney, Agent, or Firm* — BelayIP

(57) ABSTRACT

Estimation of motor rotor position including measuring a voltage drop in an inverter during an initialization of an electric motor at zero revolutions per minute and estimating a rotational speed and position of the electric motor in response to a counter-electromotive force and the voltage drop during an increasing of the rotational speed of the electric motor from zero revolutions per second to a steady state rotational speed.

18 Claims, 5 Drawing Sheets

200

(56) References Cited

U.S. PATENT DOCUMENTS

| | | | | |
|---|---|---|---|---|
| 11,463,035 | B2 * | 10/2022 | You | H01M 8/04753 |
| 2009/0200974 | A1 | 8/2009 | Yasui | |
| 2015/0207447 | A1 * | 7/2015 | Sato | H02P 6/181<br>318/400.11 |
| 2018/0183366 | A1 * | 6/2018 | Hara | H02P 6/08 |

OTHER PUBLICATIONS

W. Yang et al.; "Online Detection of Inverter Voltage Error Based on the Voltage Oversampling Measurement and Sigmoidal Function Model,"; IEEE Transactions on Power Electronics; vol. 37; No. 1; pp. 303-312; Jan. 2022; doi: 10.1109/TPEL.2021.3099940.

Boldea I et al.: ""Active Flux" DTFC-SVM Sensorless Control of IPMSM", IEEE Transactions on Energy Conversion, IEEE Service Center, Piscataway, NJ, US, vol. 24, No. 2, Jun. 1, 2009 (Jun. 1, 2009), pp. 314-322, XP011257939, ISSN:0885-8969.

Yang Shih-Chin et al: "Permanent Magnet Machine Position Sensorless Drive at Low Speed with Phase Voltage Measurement", IECON 2018—44th Annual Conference of the IEEE Industrial Electronics Society, IEE, Oct. 21, 2018 (Oct. 21, 2018), pp. 642-646, XP033486322, DOI: 10.1109/IECON.2018.8591770.

* cited by examiner

200

300

400

500

550

SENSORLESS OBSERVER BASED ZERO-SPEED START FOR FUEL CELL COMPRESSOR

TECHNICAL FIELD

The present disclosure generally relates to an a fuel cell compressor system with an electric motor and, more particularly, relates to a system for estimating losses in the switching circuits for three phase AC drive currents to correct the theoretical voltages by estimating self and fast characterization of the inverter non-linearity of the inverter during electronic control unit start-up and accurate prediction of the observer states at low-speed using a Flux-based observer.

BACKGROUND

Various systems include a compressor device for supplying compressed fluid to a device. For example, fuel cell systems can include a fuel cell compressor for compressing air that is fed to the fuel cell stack. This can increase operating efficiency of the fuel cell system. However, conventional compressor devices may suffer from various deficiencies. Operation of some of these devices may be inefficient. Some compressor devices may be too bulky, too heavy, or too complex for some applications. Also, the bearings used in some conventional devices may be the source of problems. Some compressor devices may have a load bearing capacity that limits their usefulness and/or operating efficiency. Furthermore, some bearings may be sources of contamination. Thus, it is desirable to provide a compressor device that has high operating efficiency which quickly reaches a steady state operational state. It is also desirable to provide a compressor device that is compact and that is less complex than conventional devices. Also, it is desirable to provide a compressor device with a more reliable and robust bearing. Moreover, it is desirable to provide a compressor device with high load bearing capacity. Thus, it is desirable to provide a sensorless fuel cell compressor to reduce transition time to an operational steady state, to increase operational efficiency and to reduce premature bearing wear. Other desirable features and characteristics of the present disclosure will become apparent from the subsequent detailed description and the appended claims, taken in conjunction with the accompanying drawings and this background discussion.

BRIEF SUMMARY

Disclosed herein are fluid compression and motor control methods and systems and related electrical systems for provisioning such systems, methods for making and methods for operating such systems, and motor vehicles and other equipment such as aircraft, ships, wind turbines and other electric vehicles equipped with onboard propulsion systems. By way of example, and not limitation, there are presented various embodiments of systems for providing a sensorless observer based zero-speed start for fuel cell compressor using a detected voltage loss within a switching inverter during a low speed motor initialization and the like.

In one embodiment, an apparatus including an electric motor, an inverter for converting a direct current to a three phase alternating current for driving the electric motor, a motor controller for determining a voltage drop across the inverter while maintaining the rotational speed of the electric motor at zero revolutions per second, for estimating a rotational position of the electric motor in response to the voltage drop and a flux based observer while increasing the rotational speed of the electric motor from zero revolutions per minute to a commanded rotational speed, and controlling a switching of the inverter in response to the rotational position, and a memory for storing a data indicative of a magnitude of the voltage drop.

In another embodiment, a method including measuring a voltage drop in an inverter during an initialization of an electric motor, and estimating a rotational speed and position of the electric motor in response to a counter-electromotive force and the voltage drop during an increasing of the rotational speed of the electric motor from zero revolutions per second to a steady state rotational speed.

In another embodiment, a fuel cell compressor control system including a centrifugal compressor for receiving the fluid via an intake, for increasing a pressure of the fluid using an impeller to generate a compressed fluid, and for outputting the compressed fluid to a fuel cell, an electric motor for driving the impeller within the centrifugal compressor in response to a three phase alternating current, an inverter for generating the three phase alternating current in response to a switching control signal and a direct current, and a motor controller for generating the switching control signal, for measuring a voltage drop in the inverter while maintaining the rotational speed of the electric motor at zero revolutions per second, and for estimating the rotational speed and a position of the electric motor in response to a counter-electromotive force and the voltage drop during an increasing of the rotational speed of the electric motor from zero revolutions per second to a steady state rotational speed.

BRIEF DESCRIPTION OF THE DRAWINGS

The present disclosure will hereinafter be described in conjunction with the following drawing figures, wherein like numerals denote like elements, and wherein.

Figure 6:
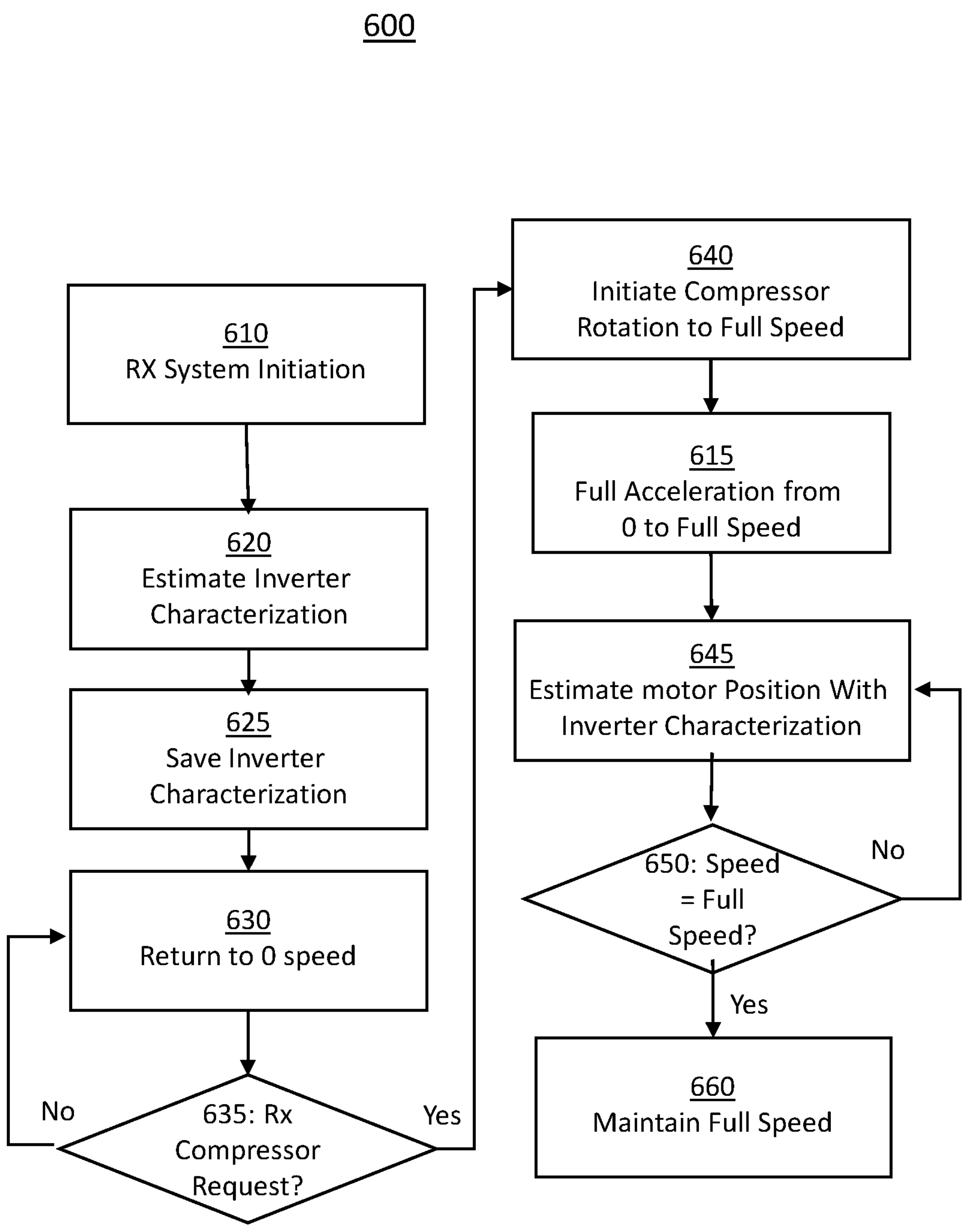

FIG. **5*a*** illustrates an exemplary characterization of an alternating current phase with a permanent magnet synchronous motor (PMSM) at zero speed according to an exemplary embodiments of the present disclosure;

FIG. **5*b* illustrates a graph of an exemplary instant acceleration for an exemplary sensorless observer based zero-speed start for fuel cell centrifugal compressor according to an exemplary embodiments of the present disclosure; and FIG. 6** shows a flowchart illustrative of an exemplary method for providing a sensorless observer based zero-speed start for fuel cell compressor according to an exemplary embodiments of the present disclosure.

DETAILED DESCRIPTION

The following detailed description is merely exemplary in nature and is not intended to limit the present disclosure or the application and uses of the present disclosure. Furthermore, there is no intention to be bound by any theory presented in the preceding background or the following detailed description.

The currently disclosed systems and methods relate to speed and position estimation for fuel cell compressors in order to reduce the time required for a high speed fuel cell compressor to reach full speed in order to achieve full compression quicker and to avoid air bearing damage. Current fuel cell compressor systems use observer-based closed loop methods in a low-speed region which suffer from inaccurate prediction of the inverter non-linearity and the inaccurate state estimates through the observer. The currently disclosed systems and methods estimate the losses in the switching circuits for the three phase AC drive currents and uses these estimated losses to correct the theoretical voltages through self and fast characterization of the non-linearity of the inverter during electronic control unit start-up and accurate prediction of the observer states at low-speed using a Flux-based observer.

Centrifugal compressors can achieve relatively high pressure ratios in a compact arrangement. Advantageously, these centrifugal compressors may employ an oil free bearing design to avoid contamination of the fuel cell catalyst. However, a centrifugal compressor wheel when employed as a fuel cell compressor will typically have a larger diameter than a traditional turbocharger. Thus, a fast and accurate inverter characterization and compensation method is required to ensure fast compressor acceleration, reduced power consumption and reduced stress on air junction bearings to increase compressor life.

Figure 1:
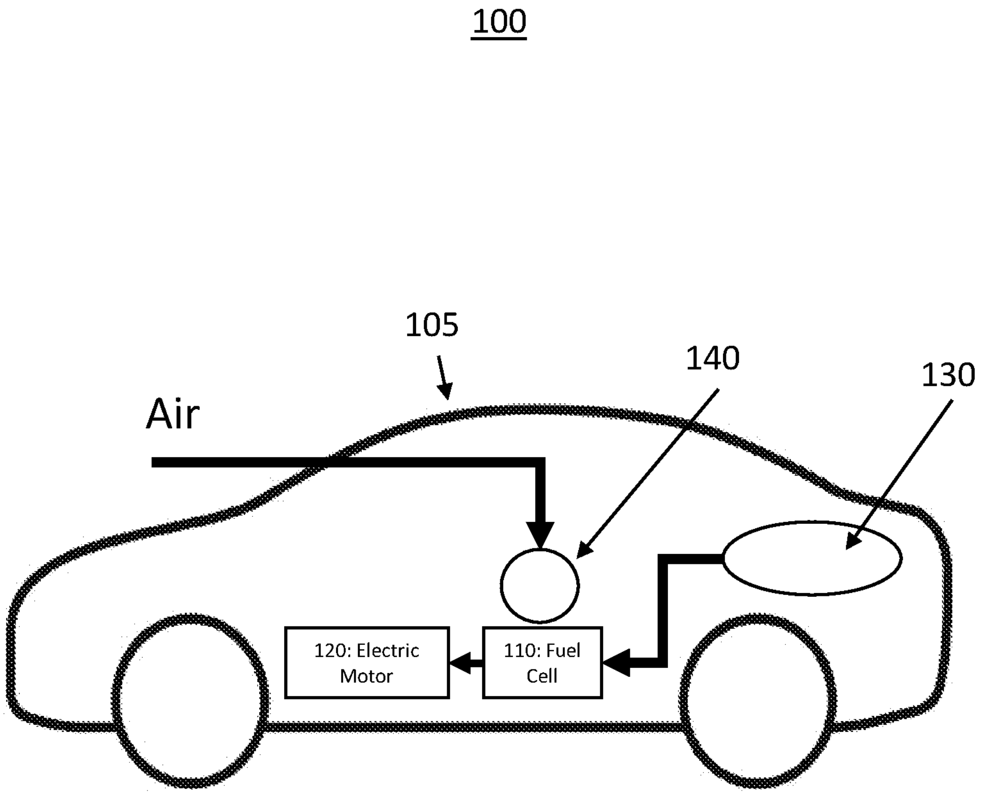
FIG. 1 illustrates an exemplary environment for use of a sensorless observer based zero-speed start for fuel cell compressor according to an exemplary embodiments of the present disclosure.

Turning now to FIG. 1, an exemplary environment 100 for use of a sensorless observer based zero-speed start for fuel cell compressor according to exemplary embodiments of the present disclosure is shown. The exemplary environment 100 includes a vehicle 105, an electric motor 120, a fuel cell 110, a fuel storage tank 130 and a compressor 140.

The electric motor 120 converts electrical energy from the fuel cell 110 to rotational mechanical energy for driving the wheels of the vehicle 105. Typically, electric vehicles use three phase alternating current (AC) electric motors to provide mechanical energy to the drive train. The three phase electric motor can be either asynchronous or synchronous. In an asynchronous, or induction, motor, the rotor is pulled into a spin, constantly trying to “catch up” with the rotating magnetic field created by the stator. Asynchronous motors are typically less expensive than synchronous motors, but offer lower efficiency and narrower speed range. Synchronous motors are AC electric motors that rotate at the same rate as the frequency of the supply current. In a synchronous motor, AC power is supplied to the stator to generate a rotating magnetic field. DC power is supplied to the rotor, which results in discrete magnetic poles. The poles in the rotor then synchronize to and follow the opposing rotating magnetic pole. The rotor turns at the same speed as the magnetic field providing high torque at low speeds, making it ideal for urban driving. A permanent magnet synchronous motor, relies on magnets to turn the rotor, which spins at the same speed as the motor’s internal rotating magnetic field.

The fuel cell 110 can be a hydrogen fuel cell used to convert the chemical energy of hydrogen and oxygen into electricity, heat and water. This conversion is performed through an electrochemical reaction, not combustion. A hydrogen fuel cell includes an anode, an electrolyte and a cathode. The anode is the negative electrode of the fuel cell. Hydrogen gas is fed to the anode, where a catalyst splits the hydrogen molecules into protons and electrons. The electrolyte is a material that allows protons to pass through it, but not electrons. The most common type of electrolyte used in hydrogen fuel cells is a proton exchange membrane. The cathode is the positive electrode of the fuel cell. Oxygen gas is fed to the cathode, where the protons from the anode combine with the electrons from the external circuit to form water. The hydrogen fuel cell produces direct current electricity which can be supplied to the rotor of the electric motor, or can be converted to AC using an inverter or the like to supply power to the stator of the electric motor to generate a rotating magnetic field.

Hydrogen is stored in, and supplied to the fuel cell 110 from the fuel storage tank 130. The hydrogen fuel cell storage tank 130 is a pressure vessel that stores hydrogen gas at high pressure. The most common type of hydrogen storage tank is a composite tank, which is made of a carbon fiber outer shell and an aluminum inner liner. The tank is filled with hydrogen gas at a pressure of 350-700 bar or 5,000-10,000 psi. The hydrogen gas in the fuel storage tank 130 is stored in a liquid state. The high pressure inside the fuel storage tank 130 causes the hydrogen gas to liquify due to the low boiling point of hydrogen. The fuel cell 110 draws the hydrogen gas from the fuel storage tank 130.

The compressor 140 is used to compress air from outside of the vehicle 105 and to supply this compressed air to the fuel cell 110. The performance of the hydrogen fuel cell 110 depends significantly on the amount of air available. The compressor 140 is used to push air into the fuel cell stack, where the oxygen is extracted to enable the reaction at the cathode. The a compressor 140 is one of the most critical components in a high performance fuel cell system. For optimal performance, the compressor 140 provides a constant flow of air to the fuel cell at the required pressure. The compressor 140 must also be able to operate efficiently to improve the performance, size, and efficiency of the overall fuel cell system, as the compressor 140 can account for a significant portion of the overall system power consumption.

Figure 2:
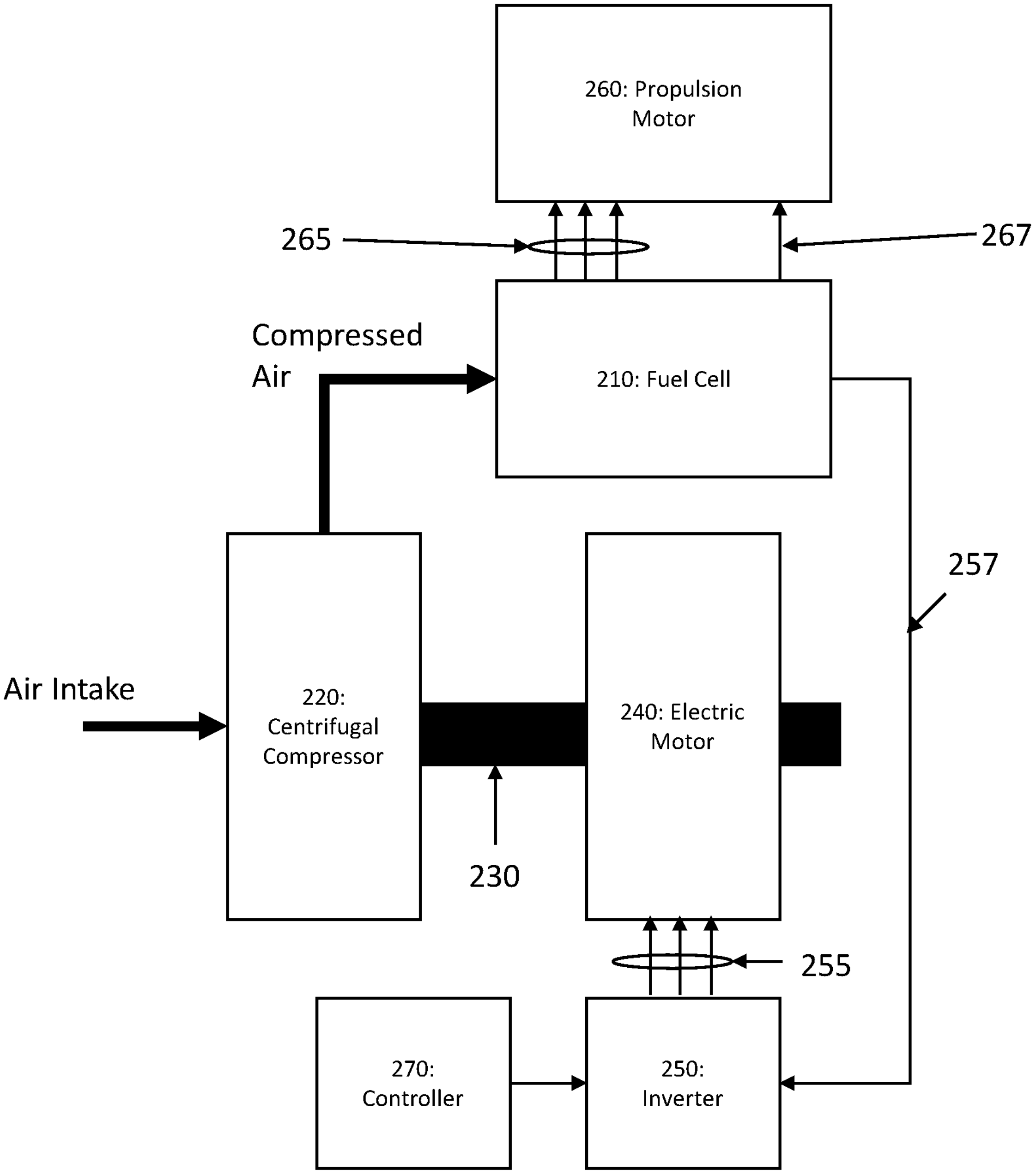
FIG. 2 shows a block diagram illustrative fuel cell system employing a sensorless observer based zero-speed start for fuel cell centrifugal compressor according to an exemplary embodiments of the present disclosure.

Turning now to FIG. 2, a block diagram illustrative fuel cell system 200 employing a sensorless observer based zero-speed start for fuel cell centrifugal compressor 220 according to an exemplary embodiments of the present disclosure is shown. The exemplary system 200 can include a fuel cell 210, a propulsion motor 260, an electric motor 240, a centrifugal compressor 220, a compressor shaft 230, a controller 270 and an inverter 250.

The centrifugal compressor 220 is configured to use draw air from outside of the system 200 via an air intake, and increase the pressure of the air to generate compressed air to be provided to the fuel cell 210. The centrifugal compressor 220 uses the centrifugal force of a rotating impeller to increase the pressure of the air. The air enters the impeller at the eye via the air intake where it is accelerated by the impeller blades. The accelerated air then flows out of the impeller into a diffuser, where the kinetic energy of the air is converted into static pressure. The static pressure rise in the impeller is typically equal to the static pressure rise in the diffuser. The compressed air 220 is provided from the centrifugal compressor 220 to the fuel cell 210. The fuel cell 210 further receives hydrogen from a hydrogen reservoir, hydrogen tank or the like, and the chemical reaction within the fuel cell of the hydrogen and the oxygen from the compressed air is used to generate a DC voltage 267 to couple to the propulsion motor 260. The fuel cell 210 may further be configured to generate a three phase AC voltage 265 which can be supplied to the propulsion motor 260.

The impeller of the centrifugal compressor 220 is driven by the electric motor 240 via the compressor shaft 230. The electric motor 240 is typically a three phase electric motor driven by a three phase electric current 255 supplied by the inverter 250. The inverter 250 can be configured to receive a DC voltage 257 from the fuel cell 210. The inverter 250 can use a series of switches to convert the DC voltage 257 to a three phase AC voltage 255 to be used to power the electric motor 240 to drive the centrifugal compressor 220. The switching of a plurality of transistors within the inverter 250 can be controlled by a controller 270 in order to control the rotational speed of the electric motor 240 and the centrifugal compressor 220. In some exemplary embodiments, a controller 240 can include an estimation unit for estimating the position of the rotor of the electric motor 240. The switching signals and DC can then be controlled in response to the estimated position of the rotor.

Figure 3:
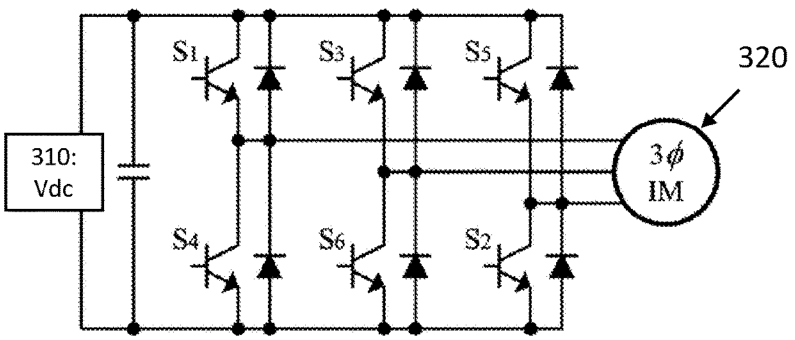
FIG. 3 illustrates an exemplary three phase inverter configuration according to an exemplary embodiments of the present disclosure.

Turning now to FIG. 3, an exemplary three phase inverter 300 configuration according to an exemplary embodiments of the present disclosure is shown. The exemplary three phase inverter 300 includes a DC voltage source 310, a three phase AC motor 310 and a plurality of switches S1, S2, S3, S4, S5, S6. In some exemplary embodiments, the switched voltages are provided to the AC motor 310 without using a position sensor for directly detecting the position of the motor rotor. The position of the motor rotor can be estimated based on the waveform applied to the motor 310. Difficulty arises in estimation of the position of the rotor during startup and extremely low-speed rotation due to the low back electromotive force (EMF).

Back EMF is a voltage generated in an electric motor when the armature rotates inside the magnetic field produced by the stator. The back EMF opposes the applied voltage and limits the current that flows through the motor. Back EMF can be used to determine a motor's rotor speed and position without requiring sensors. Back EMF is calculated based on the difference between the supplied voltage and the loss from the current through the resistance. One disadvantage is that no back EMF is generated when the motor is stationary and therefore angle estimation is not possible through model-based approaches at zero-speed. Thus, the motor startup voltages cannot be accurately estimated as the position of the rotor cannot accurately be determined until a higher motor rotational speed or steady state is achieved.

It is desirable to decrease the time required for the compressor to go from zero revolutions at startup to full speed to reduce the stress on air junction bearings in order to increase compressor life. Accurate low speed rotor position estimation can further reduce power consumption when starting from zero speed instead of idle speed. The exemplary system is configured to estimate the losses in the switching circuits for the phase AC drive currents and to use these estimated losses to correct the theoretical voltages.

The exemplary system is configured to provide self and fast characterization of the inverter non-linearity of the inverter during electronic control unit start-up and accurate prediction of the observer states at low-speed using Flux-based observer. At zero or low rotational speed, the back-emf and the effect of stator flux is near zero and the resistive effect of the system is dominant at steady state. The resistive effect of the system can be categorized as resistance of the circuit and inverter distortion. To estimate the resistive effect of the system, the back-emf based observer can be replaced by a flux-based observer such that at low speeds, the states can be determined more accurately. To determine the states, full acceleration is applied to the motor. Full acceleration can be achieved when the control current is equal to the steady state current. Advantageously, this full acceleration further allows the instable region at or near zero speed to be passed swiftly. The impedance of the inverter is in addition predicted in response to the inverter characterization and a compensation method is proposed that can be done with an integrated inverter and electric motor unit to accurately predict the resistive drop of the circuit. The states contributing to angle calculation can therefore be calculated accurately and an accurate angle/position of rotor can be obtained in the low-speed region, thereby, allowing the observer based method to be used for zero-speed start.

Inverter distortion can be caused by dead time of the inverter between switching states, turn-on time of the lower switching transistor and turn off time of the upper switching transistor. To compensate for this inverter distortion, the inverter distortion can be model as a non-linear resistive component. From a control standpoint, the inverter distortion effect on the commanded voltage is the matter of interest. So the inverter distortion can be characterized as a voltage drop component in each phase according to the following equation where $V_{distX}$ is equal to the sum of the voltage distortions at inverter turn on, inverter turn off and during dead time for each of the three phases.

$$\begin{bmatrix} v_{ds}^{\hat{r}} \\ v_{qs}^{\hat{r}} \end{bmatrix} = \begin{bmatrix} R_s & -\omega_r L_s \\ \omega_r L_s & R_s \end{bmatrix} \begin{bmatrix} i_{ds}^{\hat{r}} \\ i_{qs}^{\hat{r}} \end{bmatrix} + L_s \frac{d}{dt} \begin{bmatrix} i_{ds}^{\hat{r}} \\ i_{qs}^{\hat{r}} \end{bmatrix} + \omega_r \lambda_f \begin{bmatrix} -\sin\tilde{\theta}_r \\ \cos\tilde{\theta}_r \end{bmatrix} + V_{distX^{dq}}$$

Figure 4:
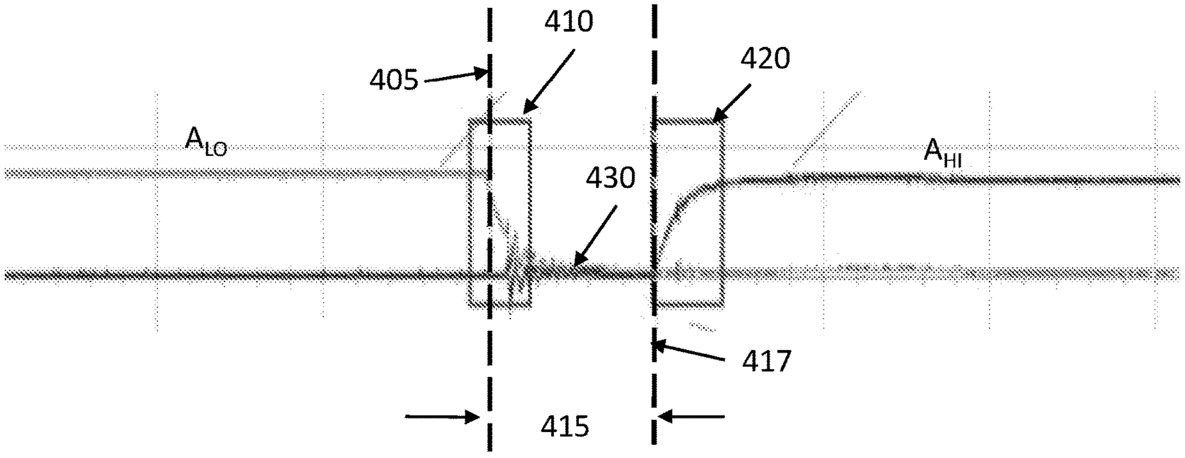
FIG. 4 illustrates an exemplary switching voltage waveform according to an exemplary embodiments of the present disclosure.

Turning now to FIG. 4, an exemplary switching voltage waveform 400 according to exemplary embodiments of the present disclosure is shown. The exemplary waveform 400 is illustrative of a measurement of the voltage losses during inverter switching. During theoretical switching, a voltage level changes from high to low instantly. During actual switching with actual components, such as MOSFETS, the transition takes some time. During this time, there is unexpected current present in the switching circuit complicating motor position estimation. For example, the exemplary switching voltage waveform 400 is illustrative of a first switching voltage distortion 410 during a transition from high to low, a dead time 415 between phases, and a second switching voltage distortion 429 during a transition from low to high. The first switching time 405 from high to low and the second switching time 417 from low to high are shown and the non-instantaneous voltage responses can be seen for the switching circuits after the switching times.

Figure 5A:
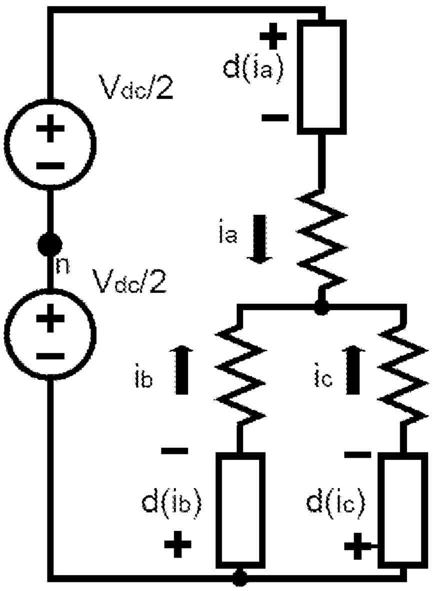

Turning now to FIG. 5, an exemplary characterization of a phase of an alternating current with the permanent magnet synchronous motor (PMSM) at zero speed according to exemplary embodiments of the present disclosure is shown. The exemplary model 500 is illustrative of a voltage drop across an inverter switch in the switching circuitry to convert a DC voltage to a three phase alternating current. Let the voltage drop due to voltage distortion be VdistA=d(ia), VdistB=d(ib), VdistC=d(ic) where ia, ib, ic are the phase currents and d(.) is the function that models this behavior.

$$\text{Let } I_a = I_{dr},\ I_b = -\frac{I_{dr}}{2},\ I_c = -\frac{I_{dr}}{2}$$

$$\text{Thus, } V_{an} = I_{dr} * rs + D\,(I_{dr}),\ Vbn = -\frac{I_{dr}}{2} * rs + D\left(-\frac{I_{dr}}{2}\right)$$

From Kirchhoff's law through the loop of Phase A-B-n, gives $$V_{drop} = D(I_a) - D\left(-\frac{I_a}{2}\right) = \frac{3}{2}(V_{ds} - I_{as} \times r_s)$$

Figure 5B:
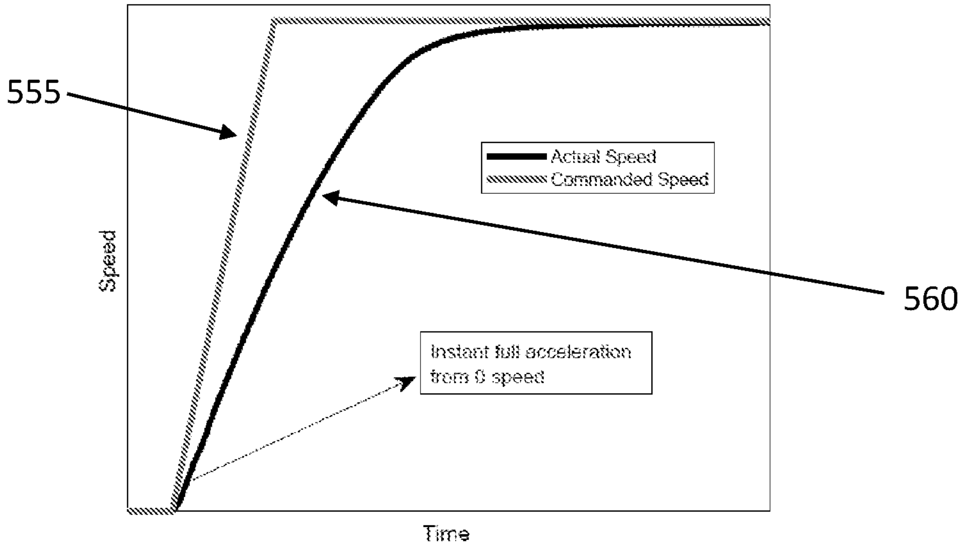

Turning now to FIG. 5*b*, a graph 550 illustrating of an exemplary instant acceleration for an exemplary sensorless observer based zero-speed start for fuel cell centrifugal compressor according to an exemplary embodiments of the present disclosure is shown. The relationship between the commanded speed 555 and the actual speed 560 is show from zero speed, or standstill starting speed, to full speed.

Turning now to FIG. 6, a flowchart illustrative of an exemplary method for providing a sensorless observer based zero-speed start for fuel cell compressor according to exemplary embodiments of the present disclosure is shown. The method is first operative to receive 610 a system initiation for the fuel cell propulsion system. In response to the system initiation, the method is next operative to estimate 620 an inverter characterization at zero speed. In some exemplary embodiments the inverter characterization can be estimated in response to a resistive drop of the inverter circuit. Inverter distortion can be model as a non-linear resistive component. From a control standpoint, the inverter distortion effect on the commanded voltage is the matter of interest. In some exemplary embodiments, the inverter distortion can be characterized as a voltage drop component in each phase. The states contributing to angle calculation can be estimated and used to estimate an angle and/or position of the rotor in a low-speed region between 0 speed and idle speed, thereby, allowing an observer based method to be used for zero-speed start. In some exemplary embodiments, the inverter characterization can be performed with an integrated inverter and electric motor. The inverter characterization is then saved 625 to a memory communicatively coupled to the fuel cell compressor controller or the like. Current is removed from the compressor inverter circuit and the compressor stays 630 at zero speed.

The method is next operative to determine if 635 a control signal indicative of a request for activation of the fuel cell compressor has been received. If no control signal is received, the method maintains the zero speed of the compressor. If the request for activation has been received, the method is then operative to initiate 640 the compressor rotation from 0 speed to full speed. In response to the initiation, the method is next operative to rotate 615 a centrifugal compressor from a 0 revolution per second speed to full speed. In some exemplary embodiments, a current equal to an expected steady state motor current can be applied to the switching network of an inverter. For example, a full acceleration where the applied current is equal to a maximum supplied current is applied. Full acceleration from zero rotational speed to an idle rotational speed allows the instable region at zero speed to be passed swiftly.

In some exemplary embodiments, a maximum current equal to an estimated steady state current can be applied to the compressor such that the zero speed region is swiftly passed. The method is next operative to estimate 645 a motor position in response to the inverter characterization and the back EMF. At zero rotational speed, back EMF and the effect of stator flux is near zero or zero. The inverter resistance is dominant at steady state. In response to the motor position, the method next determines if 650 the centrifugal compressor has reached full speed. If full speed has not been reached, the method returns to estimating 645 the motor position in response to the inverter characterization. The steady state current is applied to the centrifugal compressor to maintain 660 steady state rotation by the centrifugal compressor such that the optimal pressure of compressed air is applied to the fuel cell.

While at least one exemplary embodiment has been presented in the foregoing detailed description, it should be appreciated that a vast number of variations exist. It should also be appreciated that the exemplary embodiment or exemplary embodiments are only examples, and are not intended to limit the scope, applicability, or configuration of the present disclosure in any way. Rather, the foregoing detailed description will provide those skilled in the art with a convenient road map for implementing an exemplary embodiment of the present disclosure. It is understood that various changes may be made in the function and arrangement of elements described in an exemplary embodiment without departing from the scope of the present disclosure as set forth in the appended claims.

What is claimed is:

1. An apparatus comprising:

an electric motor;

an inverter for converting a direct current to a three phase alternating current for driving the electric motor;

a motor controller for determining a voltage drop across the inverter while maintaining a rotational speed of the electric motor at zero revolutions per second, for estimating a rotational position of the electric motor in response to the voltage drop and a flux based observer while increasing the rotational speed of the electric motor from zero revolutions per minute to a commanded rotational speed, and controlling a switching of the inverter in response to the rotational position;

a memory for storing a data indicative of a magnitude of the voltage drop, and wherein the motor controller is configured to determine that the voltage drop results from a first switching loss of a first transistor within the inverter, a second switching loss of a second transistor within the inverter, and a dead time between switching of the first transistor and the second transistor.

2. The apparatus of claim 1 wherein the voltage drop across the inverter is determined during an initialization of a compressor and wherein the rotational speed of the electric motor is maintained at zero revolutions per second during the determination of the voltage drop.

3. The apparatus of claim 1 wherein the electric motor drives a centrifugal compressor for use in a hydrogen fuel cell propulsion system.

4. The apparatus of claim 1 wherein the direct current has a variable magnitude during the characterization of the voltage drop in the inverter maintaining the rotational speed of the electric motor at zero revolutions per minute.

5. The apparatus of claim 1 wherein the commanded rotational speed is an operational rotational speed for a centrifugal compressor.

6. The apparatus of claim 1 wherein the voltage drop is a non-linear voltage drop and wherein the rotational speed and a position of the electric motor is determined in response to a counter-electromotive force and the non-linear voltage drop.

7. The apparatus of claim 1 wherein the motor controller is further operative to generate a switching control signal for switching a plurality of transistors within the inverter to control a frequency of the three phase alternating current for driving the electric motor.

8. The apparatus of claim 1 wherein the rotational speed and a position of the electric motor are determined in response to the voltage drop until the commanded operational rotational speed is reached.

9. The apparatus of claim 1 wherein the electric motor rotates a centrifugal compressor for compressing air for introduction into a hydrogen fuel cell.

10. A method comprising:

measuring a voltage drop in an inverter during an initialization of an electric motor;

estimating a rotational speed and position of the electric motor in response to a counter-electromotive force and the voltage drop during an increasing of the rotational speed of the electric motor from zero revolutions per second to a steady state rotational speed; and wherein the voltage drop results from a first switching loss of a first transistor, a second switching loss of a second transistor within the inverter and a dead time between the switch of the first transistor and switching of the second transistor.

11. The method of claim 10 the voltage drop is determined while maintaining the rotational speed of the electric motor at zero revolutions per second.

12. The method of claim 10 wherein the rotational speed and a rotor position are determined in response to the voltage drop and a counter-motive electromotive force until the steady state rotational speed is reached.

13. The method of claim 10 wherein the inverter is configured to convert a direct current to a three phase alternating current for driving the electric motor.

14. The method of claim 10 wherein the electric motor is a permanent magnet synchronous motor.

15. The method of claim 10 wherein the voltage drop is determined while at zero revolutions per second.

16. The method of claim 10 wherein the rotational speed of the electric motor is controlled in response to a switching signal applied to the inverter.

17. The method of claim 10 wherein a variable direct current is applied to the inverter while maintaining zero rotational speed of the electric motor.

18. A system for compressing a fluid comprising;

a centrifugal compressor for receiving the fluid via an intake, for increasing a pressure of the fluid using an impeller to generate a compressed fluid, and for outputting the compressed fluid to a fuel cell;

an electric motor for driving the impeller within the centrifugal compressor in response to a three phase alternating current;

an inverter for generating the three phase alternating current in response to a switching control signal and a direct current;

a motor controller for generating the switching control signal, for measuring a voltage drop in the inverter while maintaining the rotational speed of the electric motor at zero revolutions per second, and for estimating the rotational speed and a position of the electric motor in response to a counter-electromotive force and the voltage drop during an increasing of the rotational speed of the electric motor from zero revolutions per second to a steady state rotational speed, and wherein the voltage drop results from a first switching loss of a first transistor within the inverter, a second switching loss of a second transistor within the inverter and a dead time between the switching of the first transistor and the switching of the second transistor.

* * * * *